United States Patent
Wu et al.

(10) Patent No.: US 7,120,317 B1
(45) Date of Patent: Oct. 10, 2006

(54) METHOD AND SYSTEM FOR A PROGRAMMABLE IMAGE TRANSFORMATION

(75) Inventors: Terry Wu, San Jose, CA (US); Chung-I Chiang, Fremont, CA (US)

(73) Assignee: Silicon Motion, Inc., San Jose, CA (US)

( * ) Notice: Subject to any disclaimer, the term of this patent is extended or adjusted under 35 U.S.C. 154(b) by 607 days.

(21) Appl. No.: 09/798,616

(22) Filed: Mar. 1, 2001

(51) Int. Cl.
*G06K 9/32* (2006.01)

(52) U.S. Cl. ............... 382/296; 382/297; 345/658

(58) Field of Classification Search ............... 382/297, 382/296; 345/659, 658, 503
See application file for complete search history.

(56) References Cited

U.S. PATENT DOCUMENTS

| | | | | |
|---|---|---|---|---|
| 4,627,097 A | * | 12/1986 | Finlay et al. | 382/297 |
| 4,706,205 A | * | 11/1987 | Akai et al. | 382/297 |
| 4,808,986 A | * | 2/1989 | Mansfield et al. | 345/531 |
| 4,831,368 A | * | 5/1989 | Masimo et al. | 345/27 |
| 4,979,041 A | * | 12/1990 | Schreiber | 375/240.25 |
| 5,347,596 A | * | 9/1994 | Dominguez et al. | 382/284 |
| 5,357,599 A | * | 10/1994 | Luken | 345/627 |
| 5,734,387 A | * | 3/1998 | Patrick et al. | 345/441 |
| 5,920,688 A | * | 7/1999 | Cooper et al. | 345/650 |
| 5,973,664 A | * | 10/1999 | Badger | 345/659 |
| 6,330,374 B1 | * | 12/2001 | Yamaguchi et al. | 382/297 |
| 6,643,415 B1 | * | 11/2003 | Fukai et al. | 382/296 |

OTHER PUBLICATIONS

James D. Foley, "Computer Graphics, Principles and Practice" Addison-Wesley Publishing Co. Jul. 1997, pp. 201-202, 204.

* cited by examiner

*Primary Examiner*—Daniel Miriam
*Assistant Examiner*—Dennis Rosario
(74) *Attorney, Agent, or Firm*—Blakely, Sokoloff, Taylor & Zafman LLP

(57) ABSTRACT

A method and system for a programmable image transformation is disclosed. In one embodiment of the present invention, a method for transforming an image comprises rotating an image by a predetermined angle. The image is copied from a first memory location associated with a first location of a display device to a second memory location associated with a second location of a display device.

28 Claims, 9 Drawing Sheets

METHOD AND SYSTEM FOR A PROGRAMMABLE IMAGE TRANSFORMATION

FIELD OF THE INVENTION

The present invention relates to the field of video signal processing. More particularly, the present invention relates to a system and method for a programmable image transformation.

BACKGROUND OF THE INVENTION

Two types of 2-D image transformations include translation and rotation. Any point in the (x,y) plane may be translated to a new position by adding translation amounts to the coordinates of the point. For each point P(x,y) to be moved by $d_x$ units parallel to the x axis and by $d_y$ units parallel to the y axis to the new point P'(x',y'), $x'=x+d_x$ and $y'=y+d_y$. Because each line in an object is made up of an infinite number of points, however, the translation process would take an infinitely long time. All points may be translated, by translating the line's end points and by drawing a new line between the translated endpoints.

Any point in the (x,y) plane may be rotated through an angle θ about the origin. A rotation is defined mathematically by $x'=x \cos \theta - y \sin \theta$, $y'=x \sin \theta + y \cos \theta$. Positive angles are measured counterclockwise from x towards y. For negative (clockwise) rotations, the identities $\cos(-\theta)=\cos \theta$ and $\sin(-\theta)=-\sin \theta$ may be used.

Prior art rotational transformations rely on software to perform the rotation. For example, a processor performs cosine and sine functions as described above to calculate the rotated coordinates. Performing advanced trignometric functions requires extensive computational processor cycles to complete a single pixel transform.

In one prior art direct rotation approach, a new location is calculated for each pixel by appropriate trigonometric function, thereby rotating the image through the desired angle. However, the direct calculation approach is much too slow for use in screening stored images in which each output pixel is computed from a scanned input image as the source image. It is inefficient as well, because direct calculation requires a large memory bandwidth because of single pixel access and memory page breaks, without sequential access to memory address space. The prior art direct rotation calculation of a rotated image can require many computational cycles per image scan line, which increases the cost of rotation systems.

Direct calculation approaches are additionally defective in computer display applications, especially in mobile computing and handheld computing devices. These devices may only need a limited transformation, for example rotation by fixed amounts, such as 0°, 90°, 180°, or 270° and, therefore, direct mathematical rotations may be very inefficient and costly.

SUMMARY OF THE INVENTION

The present invention provides a method and system for a programmable image transformation. In one embodiment of the present invention, a method for transforming an image comprises rotating an image by a predetermined angle, directly. The image is copied from a first memory location associated with a first location of a display device to a second memory location associated with a second location of a display device.

DETAILED DESCRIPTION

Figure 1:
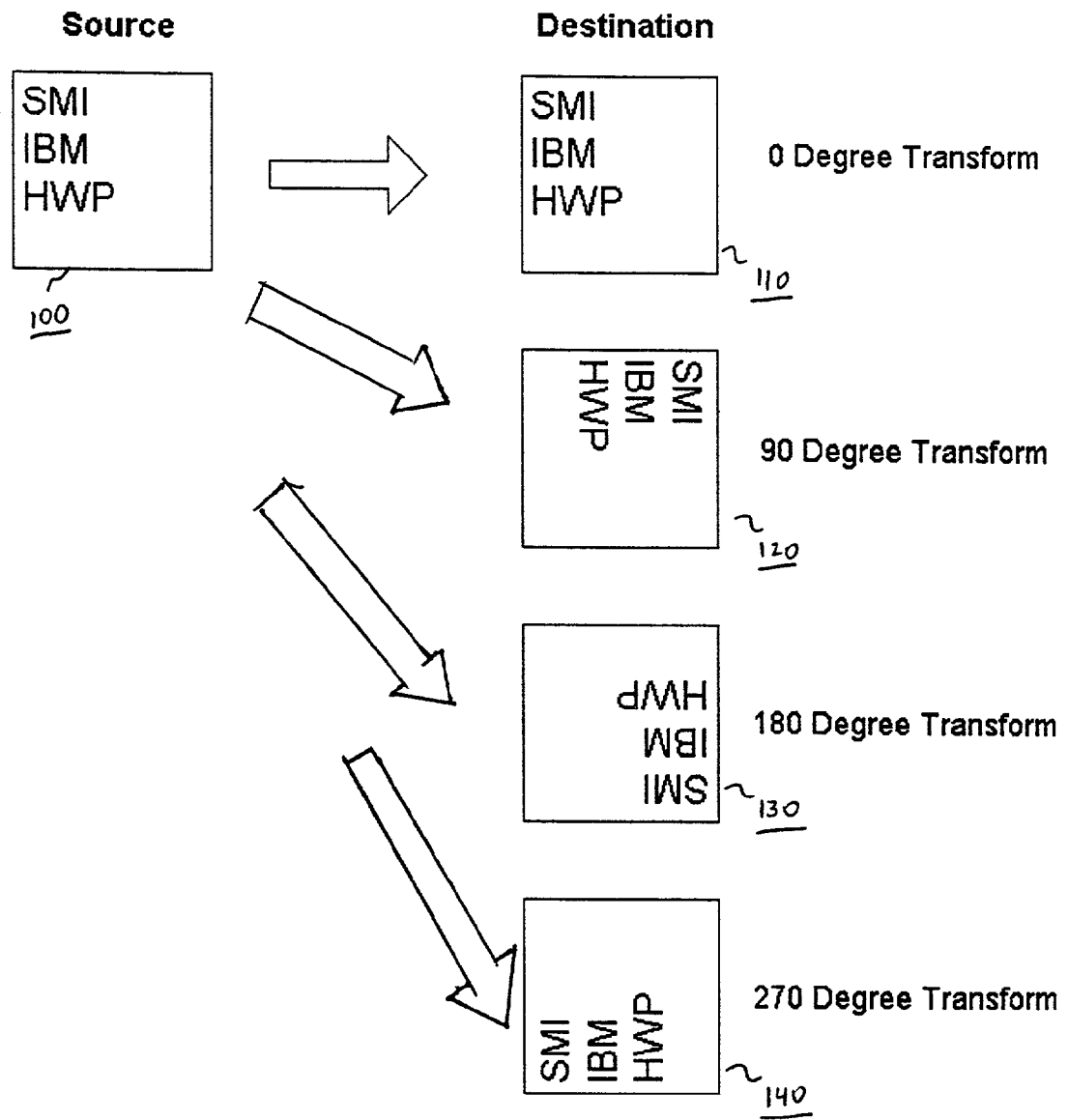
FIG. 1 illustrates image rotation according to one embodiment of the present invention.

The prior art direct rotation calculation approaches are additionally defective in computer display applications, especially in mobile computing and handheld computing devices. These devices may only need a limited transformation, for example rotation by fixed amounts, such as 0°, 90°, 180°, or 270° and, therefore, direct mathematical rotations may be very inefficient and costly.

Embodiments of the present invention relate to a method and system for a programmable image transformation. In the following description, for purposes of explanation, specific nomenclature is set forth to provide a thorough understanding of the present invention. For example, the term "video" comprises motion pictures including images and sound. However, it will be apparent to one skilled in the art that these specific details are not required in order to practice the present invention.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

FIG. 1 illustrates image rotation according to one embodiment of the present invention. Source image 100, displays three lines of text. This text is used by way of example only, but may also include similar imagery, such as, pictures, shapes, or forms. The image 100 may be displayed on a computer screen, such as a Cathode Ray Tube (CRT) display device or Liquid Crystal Display (LCD). Furthermore, image 100 may be a portion of the display device, or the entire display device. In one embodiment, destination image 110 illustrates a 0° rotational image transformation, in which the orientation of source image 100 is maintained.

In another embodiment, destination image 120 illustrates a 90° rotational image transformation, in which the orientation of source image 100 is rotated clock-wise, as shown. The transformation is performed directly from the source image 100, without intermediary transformations or rotations. The degree of rotation may be predetermined by the user of the display device.

In yet another embodiment, destination image 130 illustrates a 180° rotational image transformation, in which the orientation of source image 100 is rotated as shown. The transformation is performed directly from the source image 100, without intermediary transformations or rotations. The degree of rotation may be predetermined by the user of the display device.

In another embodiment, destination image 140 illustrates a 270° rotational image transformation, in which the orientation of source image 100 is rotated counter-clockwise as shown. The transformation is performed directly from the source image 100, without intermediary transformations or rotations. The degree of rotation may be predetermined by the user of the display device.

Figure 2:
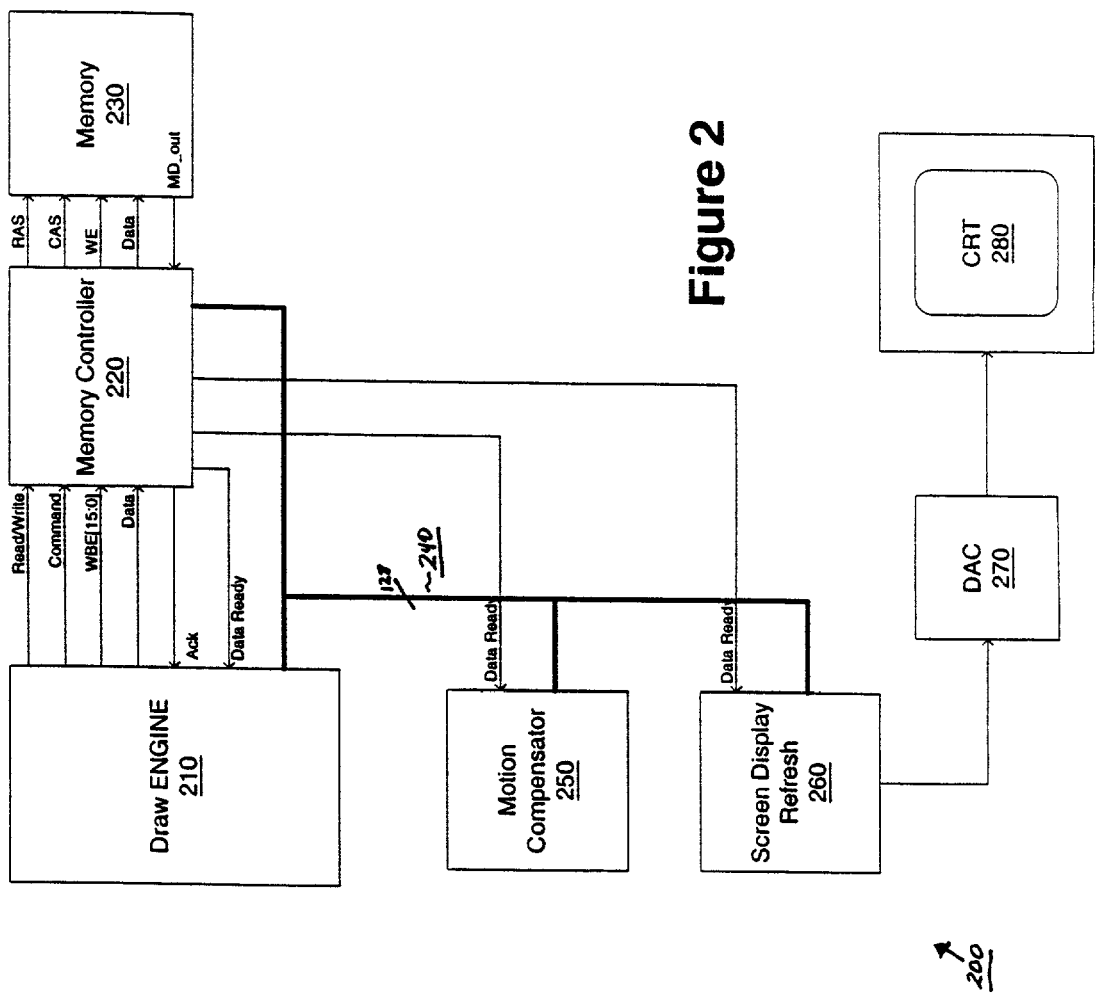
FIG. 2 illustrates a block diagram of a computer system for performing image transformation according to present invention.

FIG. 2 illustrates a block diagram of a computer system for performing image transformation according to present invention. With exception to the CRT display device 280, system 200 may reside within a graphics video controller chip, such as a Lynx3DM 3D/DVD controller chip manufactured by Silicon Motion, Inc. of San Jose, Calif. The blocks of system 200, may be distributed as individual chips as well, or in integrated circuit packages combining more than one block. Draw engine 210 is a processor for performing high speed calculations and operations for two and three dimensional imaging. Draw engine 210 will be described in greater detail in conjunction with FIG. 3. Connected to draw engine 210 is memory controller 220. Read and write commands are passed form engine 210 to controller 220, as well as command signals, write block command signals, and graphics data. An acknowledgement signal may be passed from controller 220 to engine 210, as well as, a data ready signal. The memory controller 220 regulates access to memory 230.

Memory 230 may be a high speed memory, such as random access memory (RAM), dynamic RAM (DRAM), Synchronous DRAM (SDRAM), Graphics Ram (GRAM), or Synchronous GRAM. Memory 230 receives a row address strobe (RAS) signal from controller 220, as well as a column address strobe (CAS), a write enable (WE), and graphics data. Memory 230 may also output graphics data to memory controller 220 via signal MD_out.

Also connected to memory controller 220 are motion compensator 250 and screen display refresh 260. Motion compensator 250 and screen display refresh 260 accepts data ready signals from memory controller 220. Motion compensator 250 could be an Moving Pictures Expert Group-2 (MPEG-2)/Digital Versatile Disc (DVD) decoder used to decompress image data into viewable form. Screen display refresh circuitry converts the image data into a CRT/LCD sweep data stream, used to actually show the image on the display 280. High speed data bus 240 interconnects memory controller 220, draw engine 210, motion compensator 250, and screen display refresh 260. Bus 240 may be a 128 bit bus, 64 bit bus, or other similar high bandwidth bus. Connected to screen display refresh 260 is a digital to analog converter (DAC) 270 for converting the digital video data to analog signals. A display device 280, such as a CRT or liquid crystal display (LCD) device, may be connected to DAC 270 and display the transformed images of FIG. 1.

Figure 3:
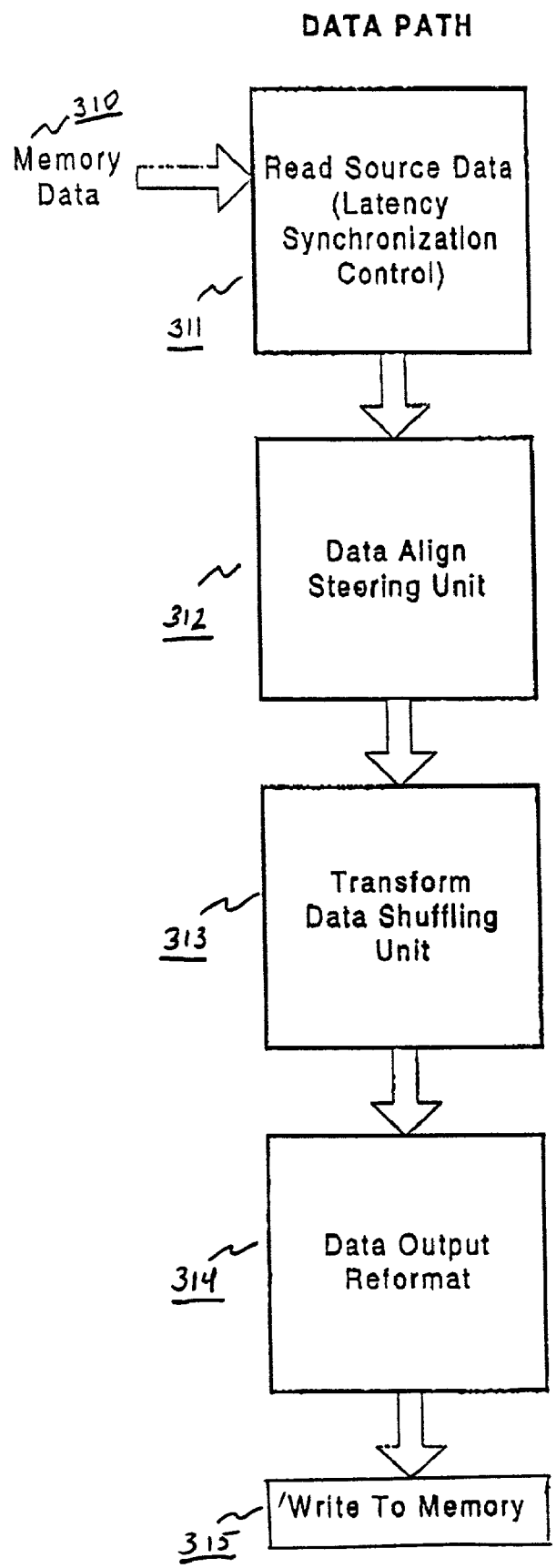
FIG. 3 is a hybrid block diagram of one embodiment of the draw engine 210 according to the present invention.

FIG. 3 is a hybrid block diagram of one embodiment of the draw engine 210 according to the present invention. Both the data path and address calculation are shown in FIG. 3. Memory data 310 is provided to engine 210 so that it may be transformed through rotation, relocation or both. Data 310 may be obtained via the MD_out signal generated by memory 230. At block 311, the memory (source) data 310 is read by draw engine 210. The data is collected and synchronized for processing as it becomes available. Engine 210 knows when data 310 is ready via the data ready signal of controller 220. Memory data 310 is passed onto processing block 312. At block 312, a data align steering unit begins to transform the memory data 310 as shown in FIG. 4.

Figure 4:
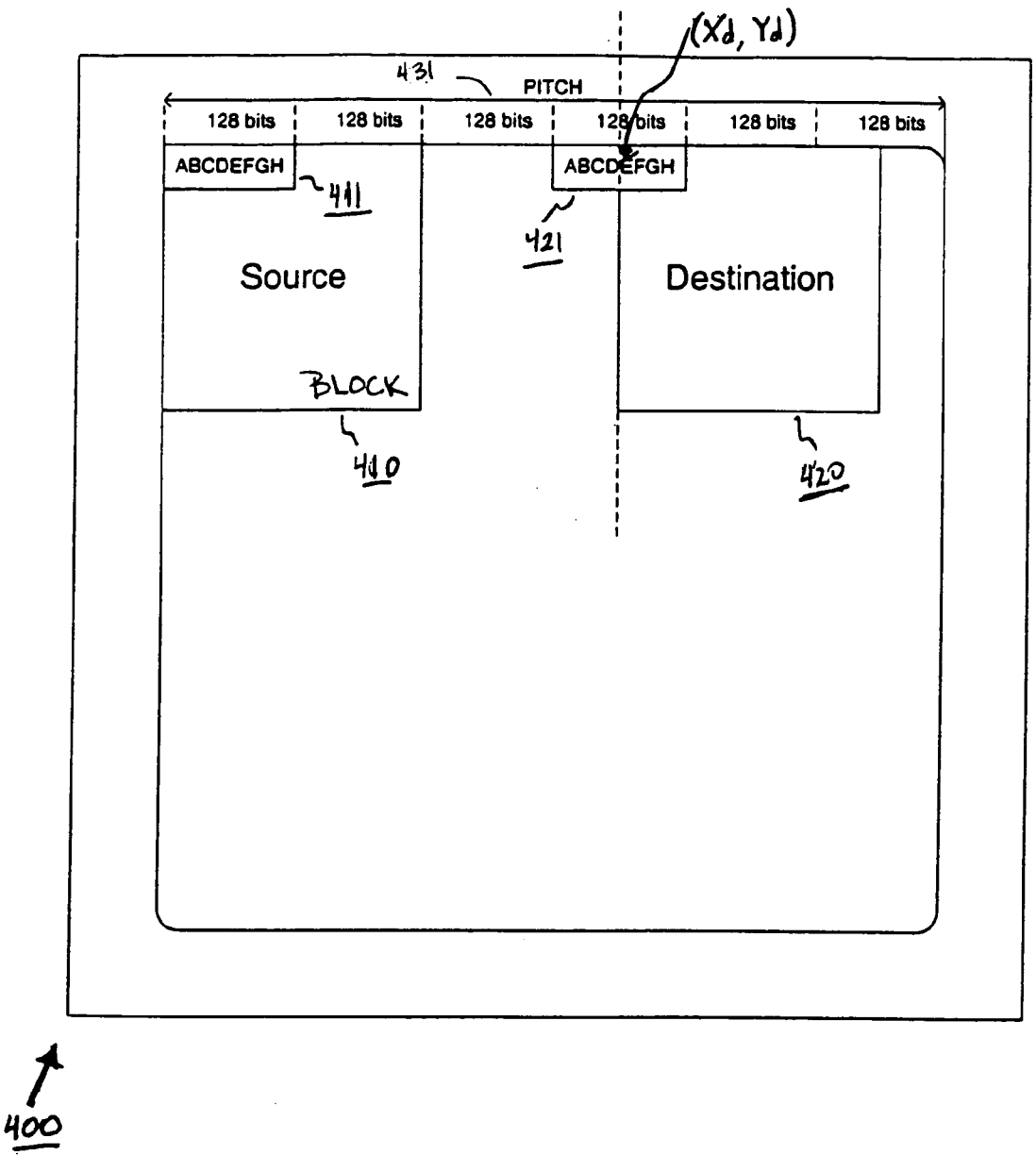
FIG. 4 illustrates a display according to one embodiment of the present invention.

FIG. 4 illustrates a display according to one embodiment of the present invention. Display 400 includes a source image location 410. Within image 410 is text 411. Text 411 is displayed by the illumination of numerous pixels on the display screen 400. The text "ABCDEFGH" 411 displayed is only for illustrative purposes only and other images are considered to be within the scope of the invention. In the example illustrated in FIG. 4, the text 411 is represented by 8 pixels, where each pixel requires 16 bits of memory. Memory data 310 is read and written by Engine 210 in chunks of 128 bits. If it is desired to perform a zero degree transformation of source location 410 to destination location 420, the text may not be aligned with the destination location 420 as shown by text 421. The data align steering unit calculates and corrects the text 421 so that it is aligned properly with destination location 420. One of ordinary skill of the art has knowledge of data align steering unit operations.

Figure 5:
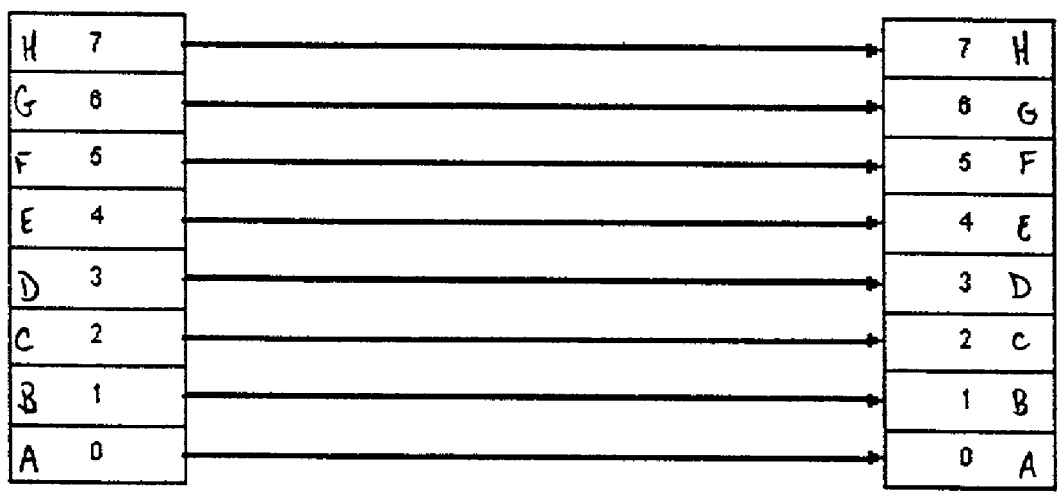
FIG. 5 illustrates data shuffling for a 0° transformation.
Figure 6:
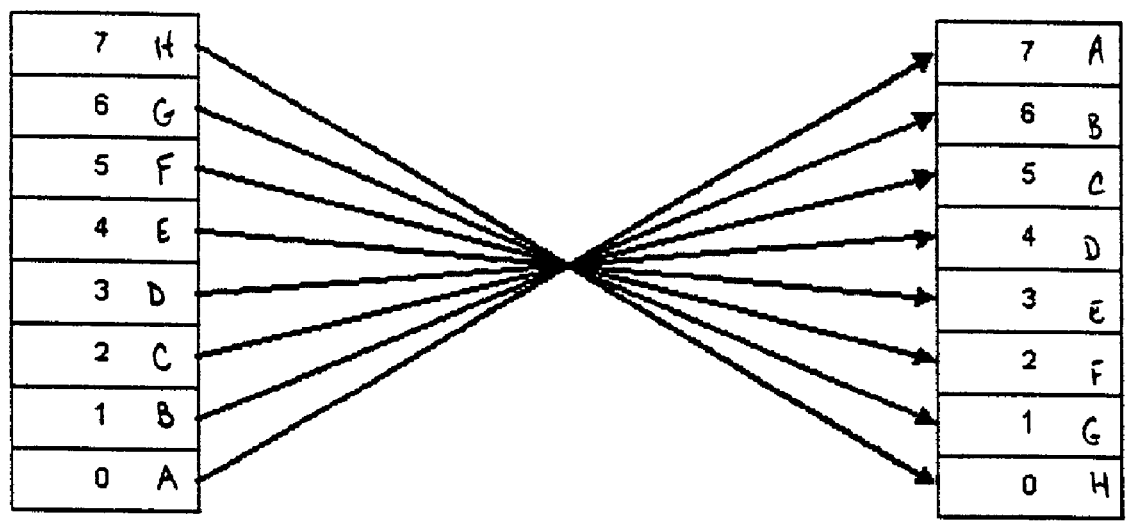
FIG. 6 illustrates data shuffling for a 180° transformation.

Once the data 310 is aligned, it is passed to processing block 313. At processing block 313, a transform data shuffling unit manipulates the data according to the degree of rotation desired. For example, if 128 bits are read, 16 bytes of data exist. Also given that 8 bits are used per pixel displayed, each byte represents a single pixel. If a 0° transformation is desired, the shuffling unit will rearrange the order of the bytes as shown in FIG. 5. FIG. 5 illustrates data shuffling for a 0° transformation. In another embodiment, if a 180° transformation is desired, the shuffling unit will reverse the order of the bytes as shown in FIG. 6. FIG. 6 illustrates data shuffling for a 180° transformation. In yet another embodiment, if a 90° transformation is desired, the transformation of FIG. 7 is performed.

Figure 7:
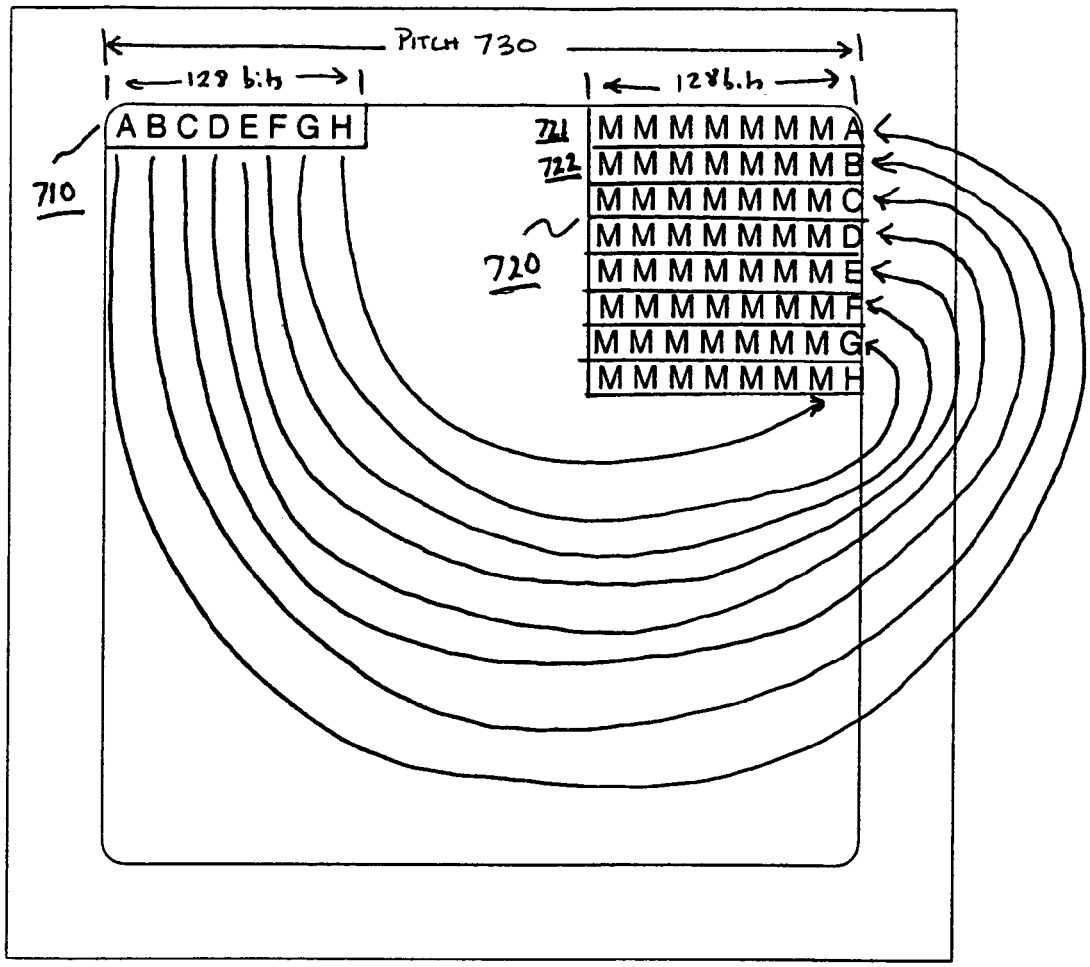
FIG. 7 illustrates a display where data shuffling of 90° is performed.

FIG. 7 illustrates a display where data shuffling of 90° is performed. Display 700, shows an image 710 that is transformed by a 90° rotation. For example, image 710 may be 128 bits, with 16 bits per pixel and thus 8 pixels total. All 8 pixels may be read in one read cycle. The data must be shuffled and placed within the destination image space 720, to have a 90° transformation. In order to accomplish this, when image 710 is read, the first pixel is copied to the last byte of the destination image's first row 721, and the remaining pixels are masked out. During the next write cycle, the second pixel, "B," is written in the last byte of the destination image's 720 second row 722. Again, the first 7 pixels of destination image's 720 second row 722 are masked out. This continues until all 8 pixels "ABCDEFGH" are shuffled into the destination image 720.

Figure 8:
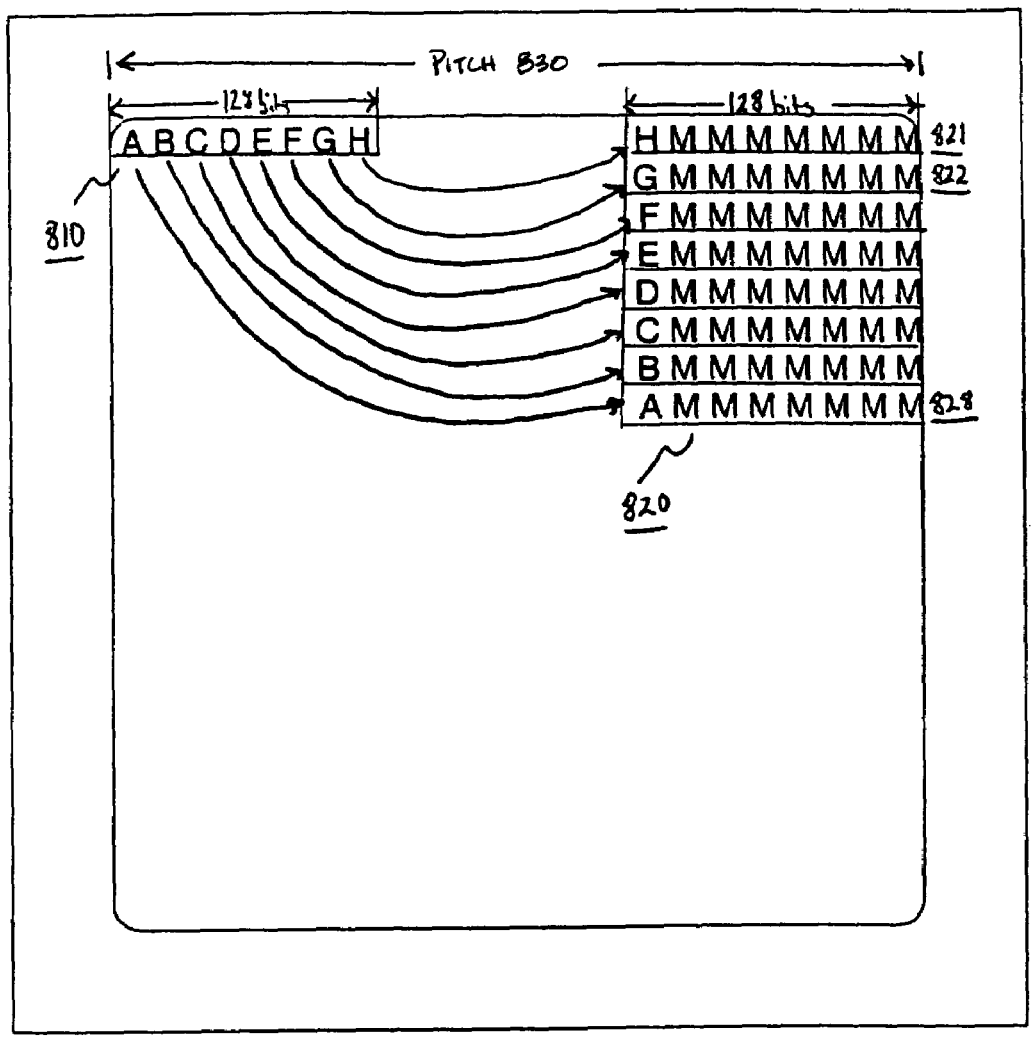
FIG. 8 illustrates a display where data shuffling of 270° is performed.

In yet another embodiment, if a 270° transformation is desired, the transformation of FIG. 8 is performed. FIG. 8 illustrates a display where data shuffling of 270° is performed. Display 800, shows an image 810 that is transformed by a 270° rotation. For example, image 810 may be 128 bits, with 16 bits per pixel and thus 8 pixels total. All 8 pixels may be read in one read cycle. The data must be shuffled and placed within the destination image space 820, to have a 270° transformation. In order to accomplish this, when image 810 is read, the last pixel "H" is copied to the first byte of the destination image's first row 821, and the remaining pixels are masked out. During the next write cycle, the seventh pixel, "G," is written in the first byte of the destination image's 820 second row 822. Again, the last 7 pixels of destination image's 820 second row 822 are masked out. This continues until all 8 pixels "ABCDEFGH" are shuffled into the destination image 820.

Figure 9:
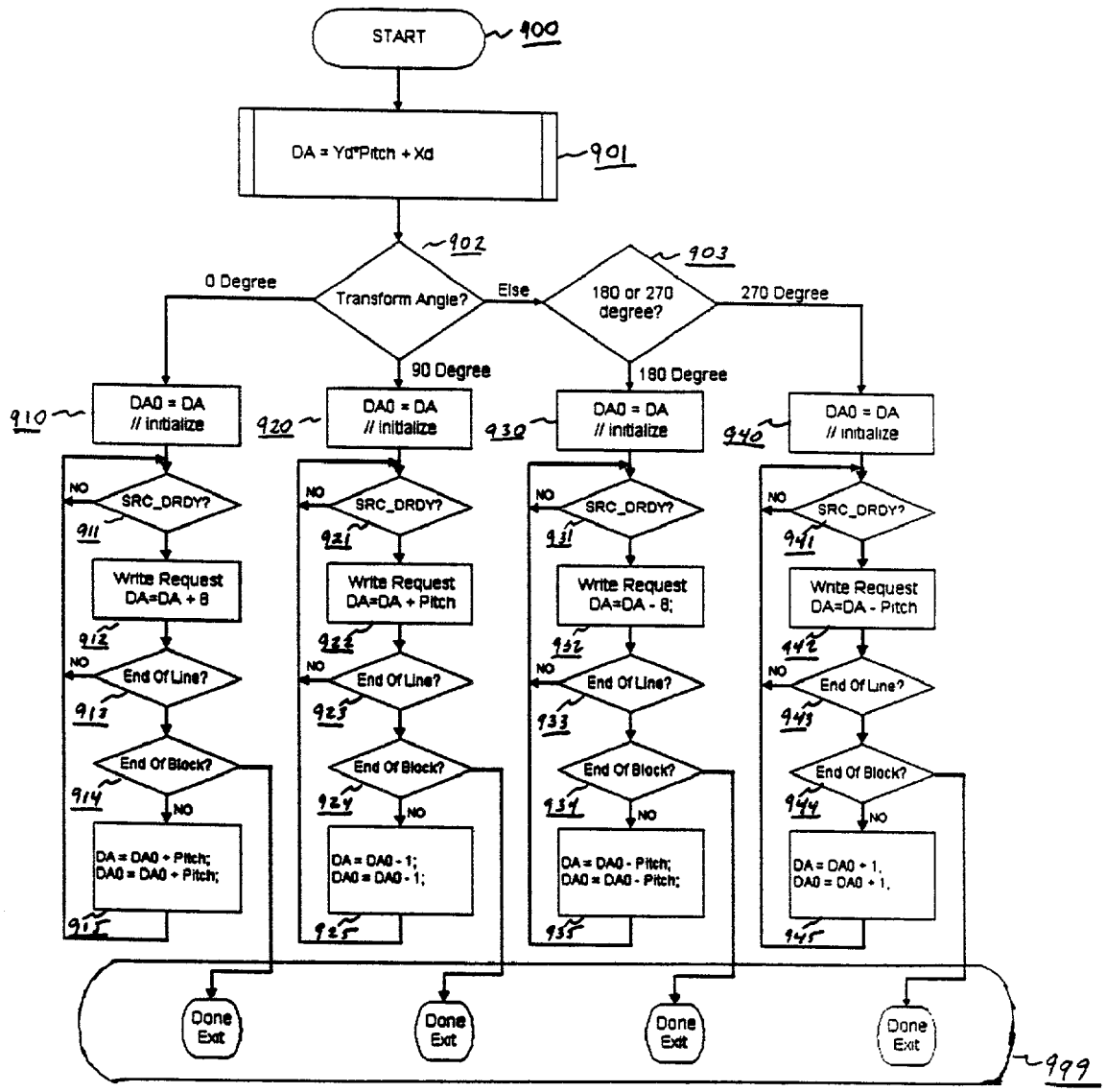
FIG. 9 illustrates a flow diagram of the address transform process performed by transform data shuffling unit.

FIG. 9 illustrates a flow diagram of the address transform process performed by transform data shuffling unit 313. The process begins at start block 900. The flow of FIG. 9 provides an example of the address transformation for a 128 bit read/write bus, with 8 bits per pixel. At processing block 901, the destination address (DA) is set equal to the number of rows (Yd) multiplied by the total number of columns (pitch 431 on display screen 400) plus the number of the destination column (Xd), as shown in FIG. 4. The DA is the actual memory address requested from memory controller 220. Flow continues to decision block 902, where the desired transformation angle is determined. If a 0° transformation is desired, flow continues to processing block 910. If a 90° transformation is desired, flow continues to processing block 920. If another degree of transformation is desired, flow continues to decision block 903. At block 903, if a 180° transformation is desired, flow continues to processing block 930. If a 270° transformation is desired, flow continues to processing block 940.

A 0° transformation begins at processing block 910, where a temporary register called Detination Address 0 (DA0), is initialized. At block 910, DA0 is initialized to equal DA, then flow passes on to decision block 911. At block 911, the process continuously loops until the memory controller 220 indicates that the source data is ready (SRC_DRDY) as shown by signal Data Ready in FIG. 2. Flow continues to processing block 912, where a write request is made to memory controller 220, and pixels from the source are written to the destination address. Each time a pixel is written to the destination, DA is incremented by the pixel size, for example 8 bits as is shown. At decision block 913, transform data shuffling unit 313 checks to see if the end of the line of pixels in source image location (block) 410 has been reached. If not, flow returns to decision block 911. If the end of the line has been reached, then flow continues to decision block 914, where transform unit 313 checks if the end of the block (source image location 410) has been reached. If the end of the block has been reached, the transformation is complete and flow ceases at exit block 999. If the end of the block has not been reached, then flow continues to processing block 915. At block 915, both the DA and DA0 are updated to be equal to DA0 plus the pitch 431. Flow is then passed back to decision block 911.

A 90° transformation begins at processing block 920, where a temporary register called Detination Address 0 (DA0), is initialized. At block 920, DA0 is initialized to equal DA, then flow passes on to decision block 921. At block 921, the process continuously loops until the memory controller 220 indicates that the source data is ready (SRC_DRDY) as shown by signal Data Ready in FIG. 2. Flow continues to processing block 922, where a write request is made to memory controller 220, and pixels from the source are written to the destination address. Each time a pixel is written to the destination, DA is incremented by the pitch, for example 768 bits. Pitch 431 is shown in FIG. 4 and pitch 730 is shown in FIG. 7. At decision block 923, transform data shuffling unit 313 checks to see if the end of the line of pixels in the location of source image 710 has been reached. If not, flow returns to decision block 921. If the end of the line has been reached, then flow continues to decision block 924, where transform unit 313 checks if the end of the block (location of source image 710) has been reached. If the end of the block has been reached, the transformation is complete and flow ceases at exit block 999. If the end of the block has not been reached, then flow continues to processing block 925. At block 925, both the DA and DA0 are updated to be equal to DA0 minus 1. Flow is then passed back to decision block 921.

An 180° transformation begins at processing block 930, where a temporary register called Detination Address 0 (DA0), is initialized. At block 930, DA0 is initialized to equal DA, then flow passes on to decision block 931. At block 931, the process continuously loops until the memory controller 220 indicates that the source data is ready (SRC_DRDY) as shown by signal Data Ready in FIG. 2. Flow continues to processing block 932, where a write request is made to memory controller 220, and pixels from the source are written to the destination address. Each time a pixel is written to the destination, DA is decremented by the pixel size, for example 8 bits as is shown. At decision block 933, transform data shuffling unit 313 checks to see if the end of the line has been reached. If not, flow returns to decision block 931. If the end of the line of pixels in source image location 410 has been reached, then flow continues to decision block 934, where transform unit 313 checks if the end of the block (source image location 410) has been reached. If the end of the block has been reached, the transformation is complete and flow ceases at exit block 999. If the end of the block has not been reached, then flow continues to processing block 935. At block 935, both the DA and DA0 are updated to be equal to DA0 minus the pitch 431, for example 768 bits as shown in FIG. 4. Flow is then passed back to decision block 931.

A 270° transformation begins at processing block 940, where a temporary register called Detination Address 0 (DA0), is initialized. At block 940, DA0 is initialized to equal DA, then flow passes on to decision block 941. At block 941, the process continuously loops until the memory controller 220 indicates that the source data is ready (SRC_DRDY) as shown by signal Data Ready in FIG. 2. Flow continues to processing block 942, where a write request is made to memory controller 220, and pixels from the source are written to the destination address. Each time a pixel is written to the destination, DA is decremented by the pitch, for example 768 bits. Pitch 431 is as shown in FIG. 4 and pitch 830 is shown in FIG. 8. At decision block 943, transform data shuffling unit 313 checks to see if the end of the line of pixels in the location of source image 810 has been reached. If not, flow returns to decision block 941. If the end of the line has been reached, then flow continues to decision block 944, where transform unit 313 checks if the end of the block (location of source image 810) has been reached. If the end of the block has been reached, the transformation is complete and flow ceases at exit block 999. If the end of the block has not been reached, then flow continues to processing block 945. At block 945, both the DA and DA0 are updated to be equal to DA0 plus one. Flow is then passed back to decision block 941.

Although described with a bus of 128 bits, where 8 bits per pixel were used, the present invention contemplates any combination of bus size and pixel size to be within the scope of the present invention.

Referring back to FIG. 3, after passing through transform data shuffling unit 313, memory data is passed onto data output reformat circuitry 314 which formats the transformed image data into the optimal length for transmission on bus 240. For example if bus 240 is 128 bit bus, reformat circuitry 314 will format the transformed image data into 128 bit blocks. Flow passes onto processing block 315, where the formatted data blocks are written to memory 230.

The foregoing has described a method and system for a programmable image transformation. It is contemplated that changes and modifications may be made by one of ordinary skill in the art, to the materials and arrangements of elements of the present invention without departing from the scope of the invention.

We claim:

1. A method for transforming an image directly from a source image memory, comprising:
    rotating an image by a predetermined angle, which includes
    copying a plurality of pixels of image data of the image from a first memory location of the source image memory associated with a first location on a display device to a second memory location of the source image memory associated with a second location on the display device, wherein the plurality of pixels include a block of bits, so that the copying includes reading all bits of the block of bits from the first memory location into a graphics engine in one read cycle, and
    wherein the first memory location and the second memory location are included in a single source image memory device
    wherein the copying includes writing one pixel of the plurality of pixels into the second memory location and masking out remaining pixels of the plurality of pixels within a display.

2. The method as claimed in claim 1 wherein the predetermined angle comprises 0°, 90°, 180° and 270°.

3. The method as claimed in claim 1 wherein the second display location is outside a visible area of the display device.

4. A method for transforming an image directly from a source image memory, comprising:
    reading source image data comprising a plurality of pixels from a first location in a source image memory device into a graphics engine, wherein the plurality of pixels include a block of bits, so that all bits of the block of bits is read into a graphics engine in one read cycle;
    aligning the source image data in a data align steering unit;
    shuffling the plurality of pixels of the source image data in a transform data shuffling unit, wherein the shuffling includes rearranging an order of the plurality of pixels;
    transforming memory addresses associated with the source image data in the transform data shuffling unit; and
    writing transformed image data by the graphics engine into a second location in the source image memory device, wherein the data align steering unit, and the transform data shuffling unit are included in the graphics engine wherein one pixel of the plurality of pixels is written into the second location and remaining pixels of the plurality of pixels are masked out within a display.

5. The method as claimed in claim 4 further comprising:
reformatting the source image data with a data output reformat circuit.

6. The method of claim 5, wherein shuffling the source image data further comprises:
reversing pixels in each row of a source image associated with the source image data for a 180° transform; and
maintaining the order of the pixels in each row of the source image associated with the source image data for a 0° transform.

7. The method of claim 6, wherein shuffling the source image data further comprises:
copying a first row of the pixels of the source image into a last column of the pixels of a destination image for a 90° transform.

8. The method of claim 6, wherein shuffling the source image data, further comprises:
copying a first row of the pixels of the source image into a first column of the pixels of the destination image for a 270° transform.

9. A system for rotating an image by predetermined angle, comprising:
a graphics engine;
a memory controller coupled to the graphics engine; and
a source image memory device coupled to the memory controller,
wherein the graphics engine rotates images received from the memory controller that are stored in the source image memory device by a predetermined angle through a direct transform in the source image memory device, which includes rearranging a plurality of pixels and writing the plurality of pixels of the image data of images from a first memory location of the source image memory device into a second memory location of the source image memory device, wherein the plurality of pixels include a block of bits, and before rearranging, all bits of the block of bits are read from the first memory location into a graphics engine in one read cycle;
wherein the graphics engine displays the images associated with a first display location in a second display location
wherein the graphics engine writes one pixel of the plurality of pixels into the second memory location and remaining pixels of the plurality of pixels are masked out within a display.

10. The system of claim 9, further comprising:
a motion compensator coupled to the graphics engine and memory controller;
a screen display refresh circuit coupled to the graphics engine; memory controller and motion compensator.

11. The system of claim 10, further comprising:
a digital to analog converter (DAC) coupled to the screen display refresh circuit; and
a display device coupled to the DAC.

12. A system for transforming an image directly from a source image memory, comprising:
means for rotating an image by a predetermined angle, which include
means for copying a plurality of pixels of image data of the image from a first memory location of the source image memory associated with a first location on a display device to a second memory location of the source image memory associated with a second location on the display device, wherein the plurality of pixels include a block of bits, so that the copying includes reading all bits of the of the block of bits from the first memory location into a graphics engine in one read cycle, and
wherein the first memory location and the second memory location are included in a single source image memory device
means for writing one pixel of the plurality of pixels into the second memory location and
masking out remaining pixels of the plurality of pixels within a display.

13. The system as claimed in claim 12 wherein the predetermined angle comprises 0°, 90°, 180°, and 270°.

14. The system as claimed in claim 12 wherein the second display location is outside a visible area of the display device.

15. A system for transforming an image, comprising:
means for reading source image data comprising a plurality of pixels from a first location in a source image memory device into a graphics engine, wherein the plurality of pixels include a block of bits so that all bits of the block of bits are read into the graphics engine in a one read cycle;
means for aligning the source image data in a data align steering unit;
means for shuffling the plurality of pixels of the source image data in a transform data shuffling unit, wherein the shuffling includes rearranging an order of the plurality of pixels;
means for transforming memory addresses associated with the source image data in the transform data shuffling unit; and
means for writing transformed image data to a second location in the source image memory device,
wherein the data align steering unit, and the transform data shuffling unit are included in the graphics engine
means for writing one pixel of the plurality of pixels into the second memory location and
masking out remaining pixels of the plurality of pixels within a display.

16. The system as claimed in claim 15 further comprising:
means for reformatting the source image data with a data output reformat circuit.

17. The system of claim 16, wherein the means for shuffling the source image data, further comprises:
means for reversing pixels in each row of a source image associated with the source image data for a 180° transform; and
means for maintaining the order of the pixels in each row of the source image associated with the source image data for 0° transform.

18. The system of claim 17, wherein the means for shuffling the source image data, further comprises:
means for copying a first row of the pixels of the source image into a last column of the pixels of a destination image for a 90° transform.

19. The system of claim 17, wherein means for shuffling the source image data, further comprises:
means for copying a first row of the pixels of the source image into a first column of the pixels of the destination image for a 270° transform.

20. A computer-readable medium having stored thereon a plurality of instructions for transforming images directly from a source image memory, said plurality of instructions when executed by computer, cause said computer to perform:

rotating an image by a predetermined angle, which includes copying a plurality of pixels of image data of the image from a first memory location of the source image memory associated with a first location on a display device to a second memory location of the source image memory associated with a second location on the display device, wherein the plurality of pixels include a block of bits, so that the copying includes reading all bits of the block of bits from the first memory location into a graphics engine in one read cycle, and wherein the first memory location and the second memory location are included in a single source image memory device writing one pixel of the plurality of pixels into the second memory location and masking out remaining pixels of the plurality of pixels with a display.

21. The computer-readable medium as claimed in claim 20 wherein the predetermined angle comprises 0°, 90°, 180°, and 270°.

22. A computer-readable medium having stored thereon a plurality of instructions for transforming images directly from a source image memory, said plurality of instructions when executed by a computer, cause said computer to perform:

reading source image data comprising a plurality of pixels from a first location in a source image memory device into a draw graphics engine, wherein the plurality of pixels include a block of bits, so that al bits of the block of bits are read into the graphics engine in one read cycle;

aligning the source image data in a data align steering unit;

shuffling the plurality of pixels of the source image data in a transform data shuffling unit, wherein the shuffling includes rearranging an order of the plurality of pixels;

transforming memory addresses associated with the source image data in the transform data shuffling unit, and writing transformed image data to a second location in the source image memory device, wherein the data align steering unit, and the transform data shuffling unit are included in the graphics engine wherein one pixel of the plurality of pixels is written into the second location and remaining pixels of the plurality of pixels are masked out within a display.

23. The computer-readable medium of claim 22 having stored thereon additional instructions, said additional instructions when executed by a computer, cause said computer to further perform:

reformatting the source image data with a data output reformat circuit.

24. The computer-readable medium of claim 23 having stored thereon additional instructions, said additional instructions when executed by a computer, cause said computer when shuffling the source image data, to further perform:

reversing pixels in each row of a source image associated with the source image data for a 180° transform; and maintaining the order of the pixels in each row of the source image associated with the source image data for a 0° transform.

25. The computer-readable medium of claim 24 having stored thereon additional instructions, said additional instructions when executed by a computer, cause said computer when shuffling the source image data, to further perform:

copying a first row of the pixels of the source image into a last column of the pixels of a destination image for a 90° transform.

26. The computer-readable medium of claim 24 having stored thereon additional instructions, said additional instructions when executed by a computer, cause said computer when shuffling the source image data, to further perform:

copying a first row of the pixels of the source image into a first column of the pixels of the destination image for a 270° transform.

27. The method of claim 1, wherein the block of bits includes 128 bits.

28. The method of claim 1, wherein the block of bits includes 64 bits.

* * * * *